(12) United States Patent
Rothe et al.

(10) Patent No.: US 8,512,154 B2
(45) Date of Patent: Aug. 20, 2013

(54) ELASTIC JOINT BODY FOR A SHAFT ARRANGEMENT

(75) Inventors: Achim Rothe, Muehldorf (DE); Steffen Jerye, Haag (DE); Wolfgang Nindel, Muehldorf (DE); Thomas Gruenwald, Muehldorf (DE)

(73) Assignee: SGF Sueddeutsche Gelenkscheibenfabrik GmbH & Co. KG, Walkrajburg (DE)

( * ) Notice: Subject to any disclaimer, the term of this patent is extended or adjusted under 35 U.S.C. 154(b) by 95 days.

(21) Appl. No.: 12/991,618

(22) PCT Filed: May 7, 2009

(86) PCT No.: PCT/EP2009/003270
§ 371 (c)(1),
(2), (4) Date: Dec. 14, 2010

(87) PCT Pub. No.: WO2009/135675
PCT Pub. Date: Nov. 12, 2009

(65) Prior Publication Data
US 2011/0092296 A1      Apr. 21, 2011

(30) Foreign Application Priority Data
May 7, 2008   (DE) .......................... 10 2008 022 475

(51) Int. Cl.
*F16D 3/62*    (2006.01)
(52) U.S. Cl.
USPC ............................................. 464/69; 464/93
(58) Field of Classification Search
USPC ................. 464/51, 55, 56, 69, 93, 94, 95, 96
See application file for complete search history.

(56) References Cited

U.S. PATENT DOCUMENTS

| 3,977,274 A | * | 8/1976 | Ditlinger |
| 4,118,952 A | | 10/1978 | Kobayashi |
| 4,182,139 A | * | 1/1980 | Hornig et al. ................... 464/55 |
| 4,188,802 A | | 2/1980 | Zeidler et al. |
| 4,790,794 A | | 12/1988 | Takeda et al. |

(Continued)

FOREIGN PATENT DOCUMENTS

| CH | 321633 | 5/1957 |
| DE | 1021212 | 12/1957 |

(Continued)

OTHER PUBLICATIONS

European Patent Office, International Search Report for PCT/EP2009/003270, Sep. 15, 2009.

*Primary Examiner* — Gregory Binda
*Assistant Examiner* — Matthieu Setliff
(74) *Attorney, Agent, or Firm* — Wood, Herron & Evans, LLP

(57) ABSTRACT

An elastic joint body for the articulated connection of two shaft sections includes a plurality of bushings arranged in the circumferential direction in predetermined angular intervals with respect to a center axis of the joint body, a plurality of loop packets wrapping around two adjacent bushings each, and a rubber-elastic casing at least partially embedding the loop packets and the bushings. In order to prolong the service life of such a joint body and to avoid undesired frictional effects between adjacent loop packets, one support arrangement is at least partially embedded in the rubber-elastic casing, with the support arrangement supporting at least part of a loop packet between adjacent bushings.

18 Claims, 17 Drawing Sheets

(56) References Cited

U.S. PATENT DOCUMENTS

| | | | | |
|---|---|---|---|---|
| 5,562,545 | A | * | 10/1996 | Wahling et al. ............... 464/93 |
| 5,766,675 | A | * | 6/1998 | Andra et al. ............... 464/69 X |
| 6,203,434 | B1 | * | 3/2001 | Albers ............... 464/69 X |
| 6,315,670 | B1 | * | 11/2001 | Andra et al. ............... 464/69 |
| 7,871,331 | B2 | * | 1/2011 | Wahling et al. ............... 464/69 |
| 2003/0022720 | A1 | | 1/2003 | Takei |
| 2011/0300953 | A1 | * | 12/2011 | Waehling et al. |
| 2012/0094774 | A1 | * | 4/2012 | Brandl et al. |

FOREIGN PATENT DOCUMENTS

| | | | | |
|---|---|---|---|---|
| DE | 2705598 | | 8/1978 | |
| DE | 3218521 | | 11/1983 | |
| DE | 3734089 | | 6/1988 | |
| DE | 4204973 | | 8/1992 | |
| DE | 4304274 | | 3/1994 | |
| DE | 4243447 | | 6/1994 | |
| DE | 19720857 | | 11/1998 | |
| DE | 102006001200 | | 8/2006 | |
| EP | 1344954 | | 9/2003 | |
| FR | 2313595 | | 6/1976 | |
| GB | 546351 | | 9/1942 | |
| JP | 55001067 | | 1/1980 | |
| JP | 62292924 A | * | 12/1987 | ............... 464/69 |
| JP | 03229018 | * | 10/1991 | |
| JP | 03229018 A | * | 10/1991 | ............... 464/69 |
| JP | 11325101 | | 11/1999 | |
| WO | 9214597 | | 9/1992 | |

* cited by examiner

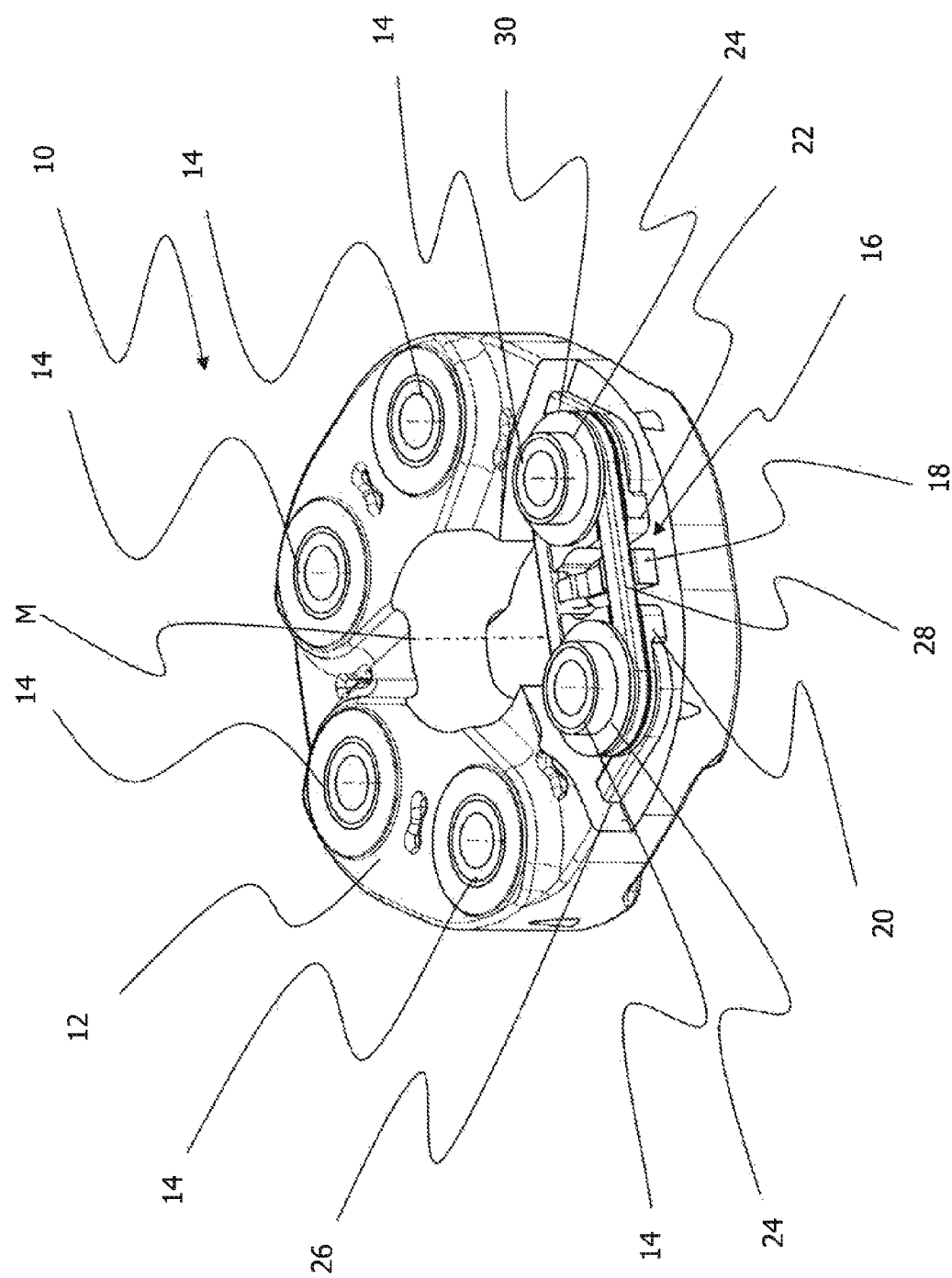

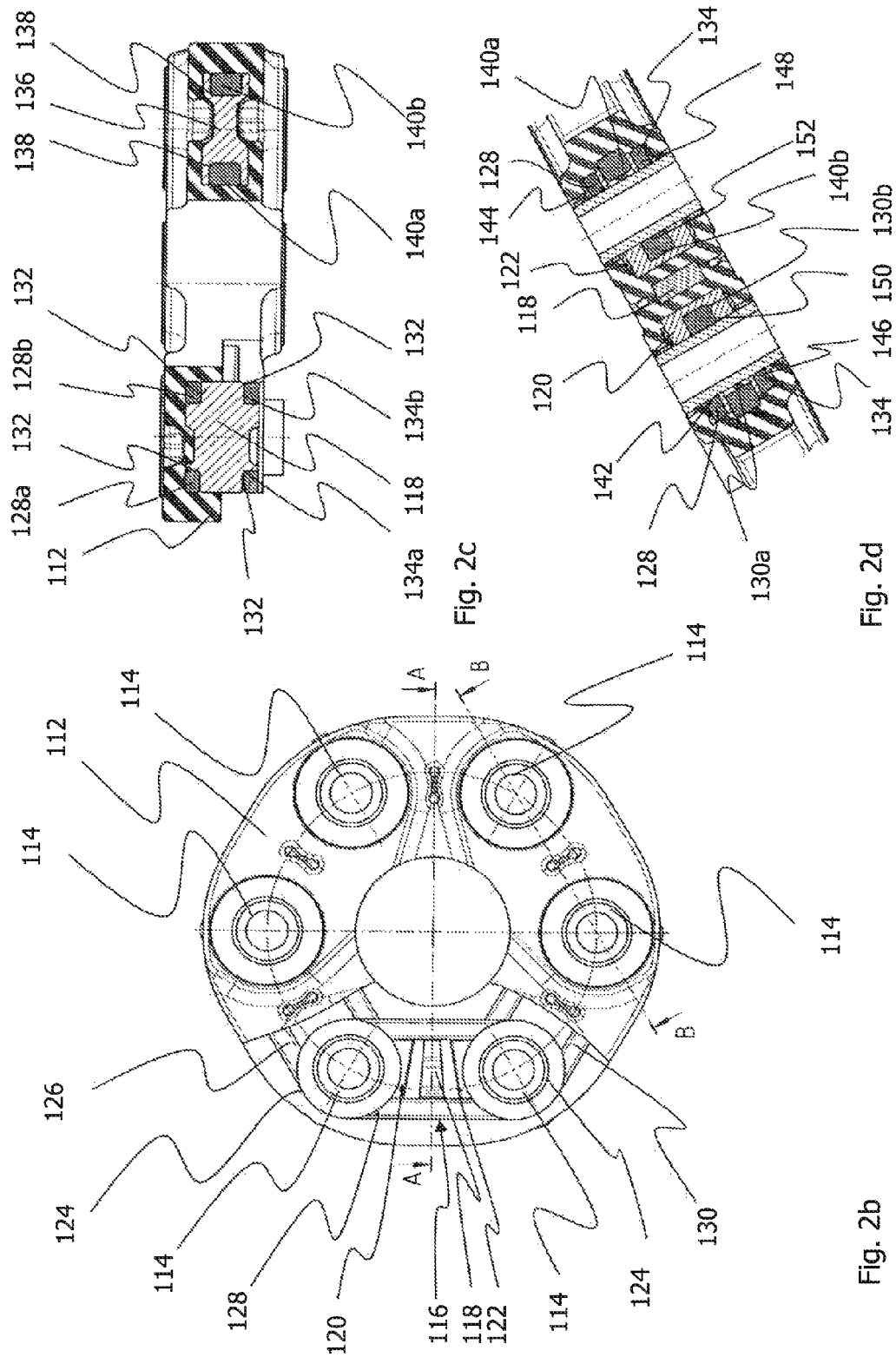

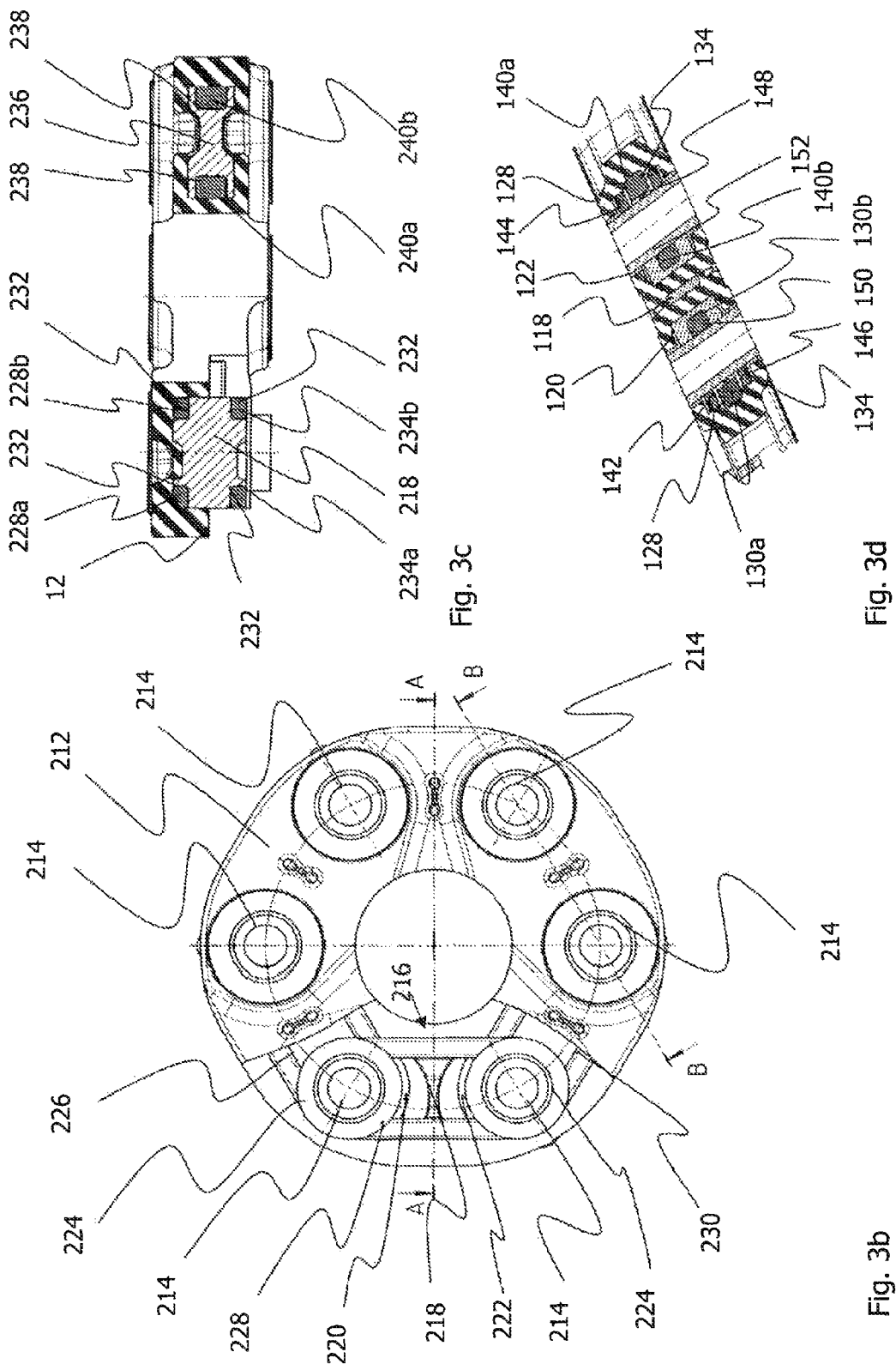

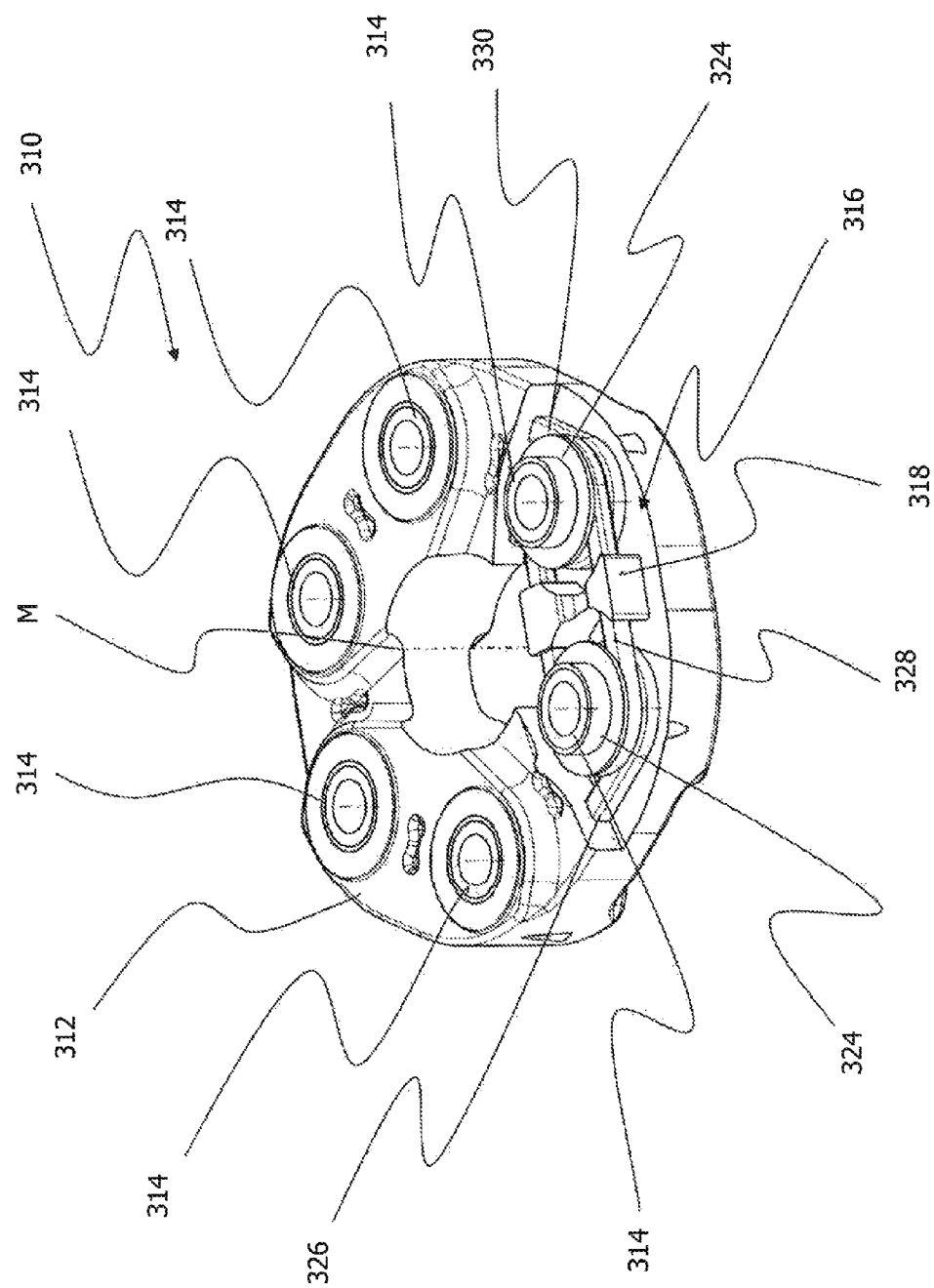

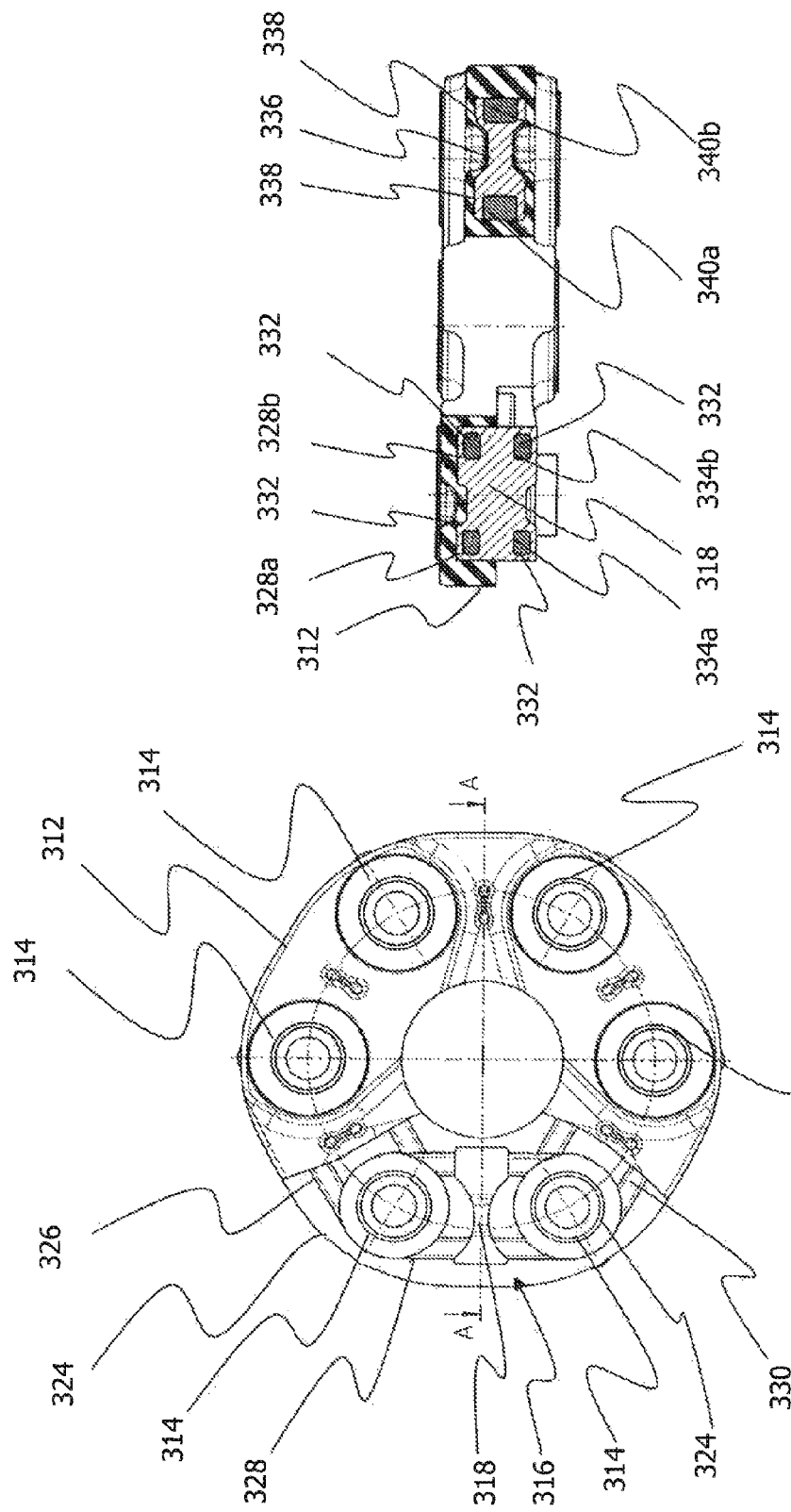

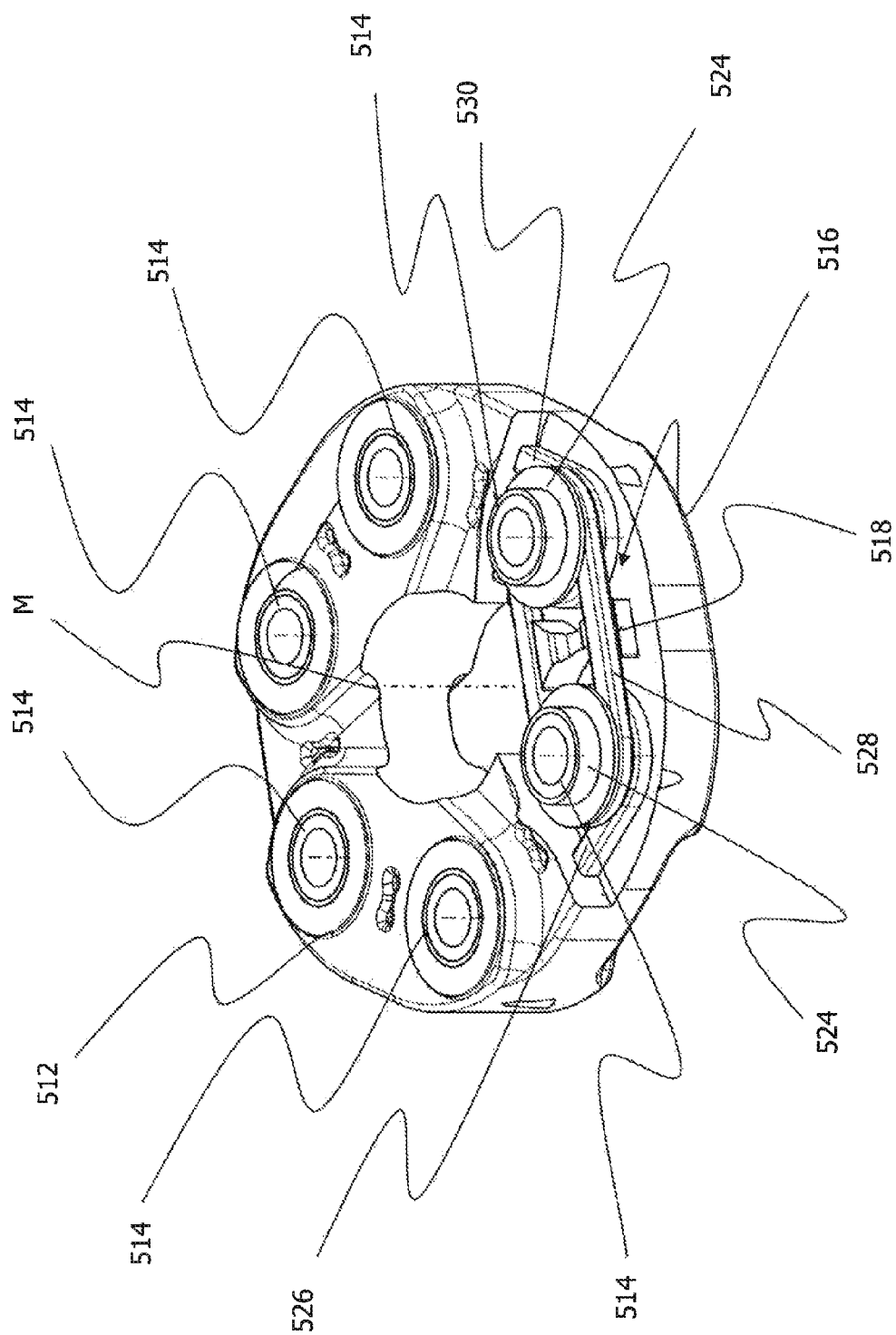

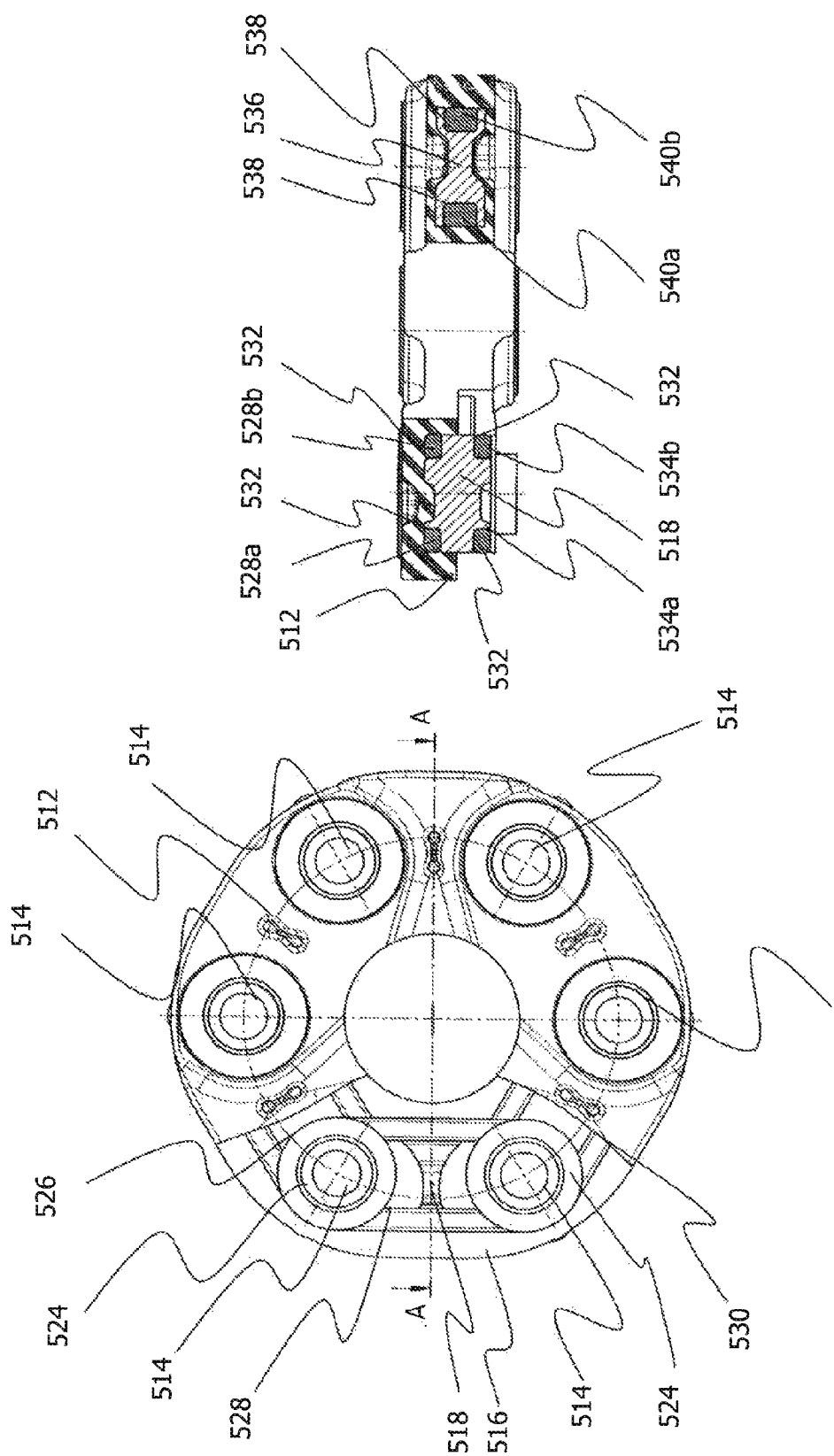

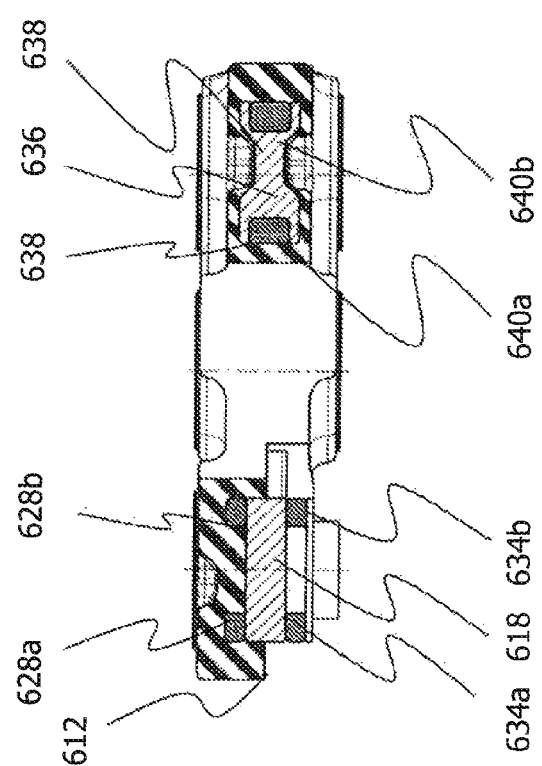
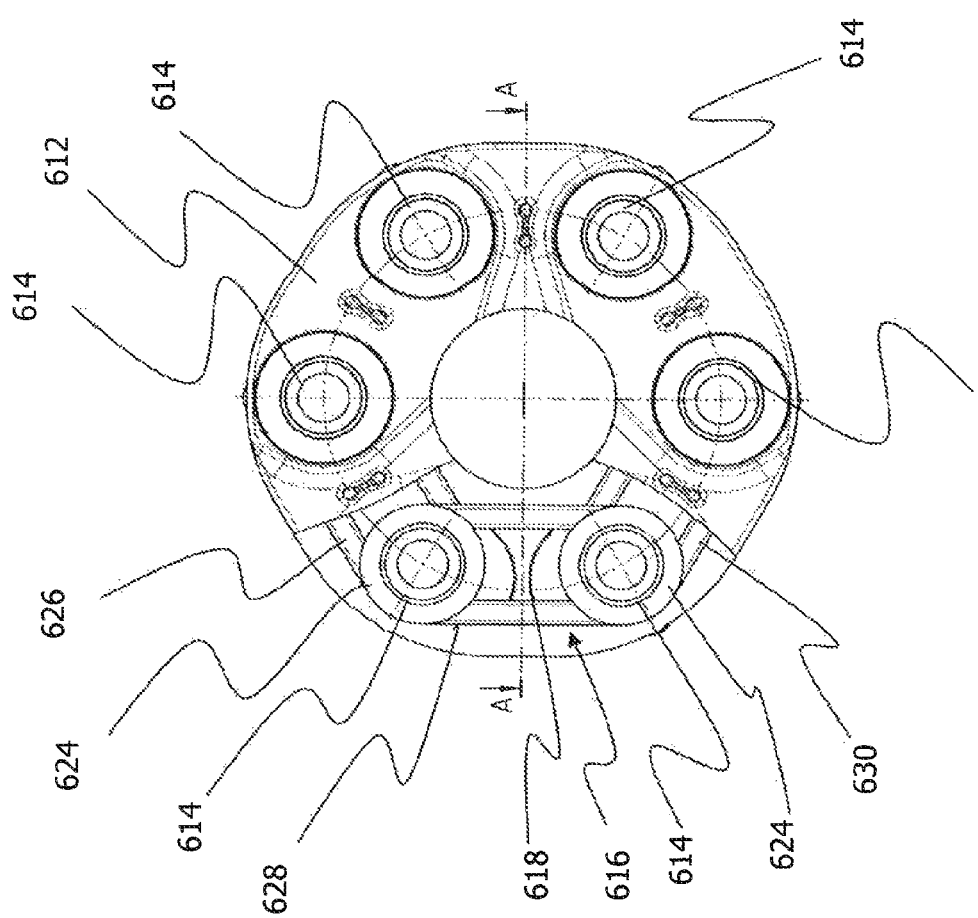
Fig. 7c
Fig. 7b

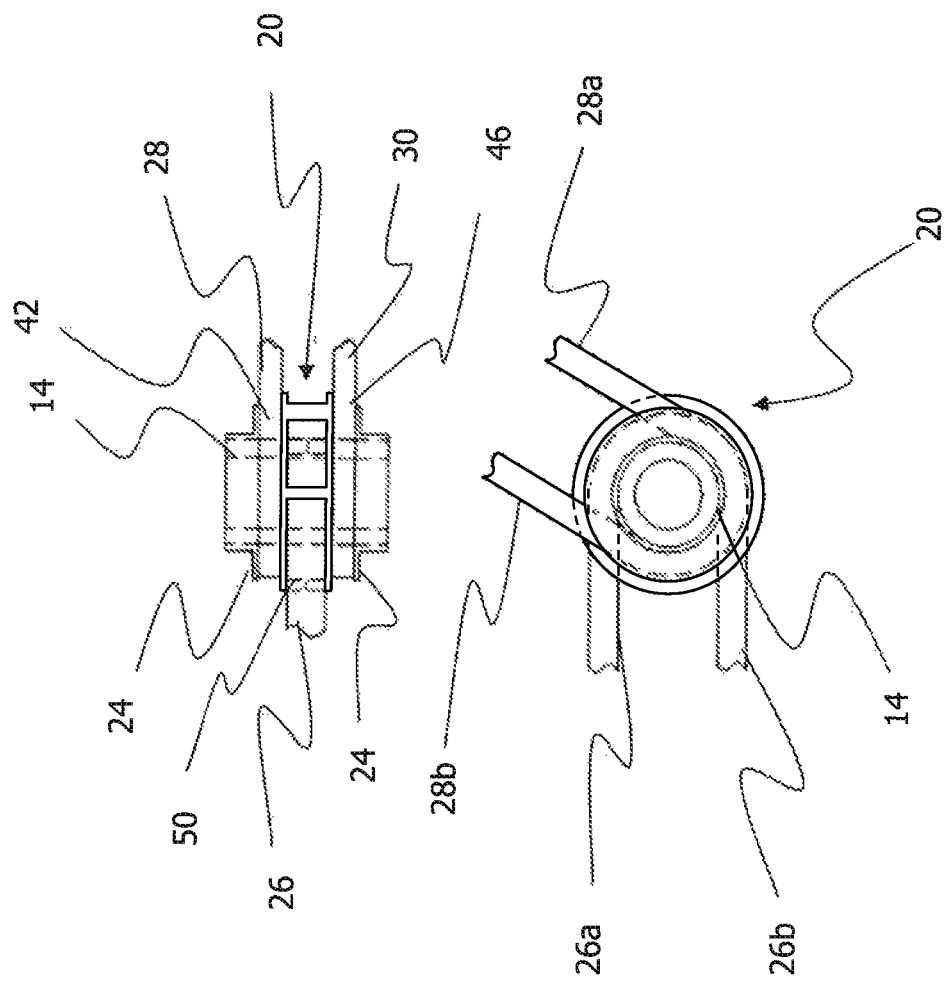

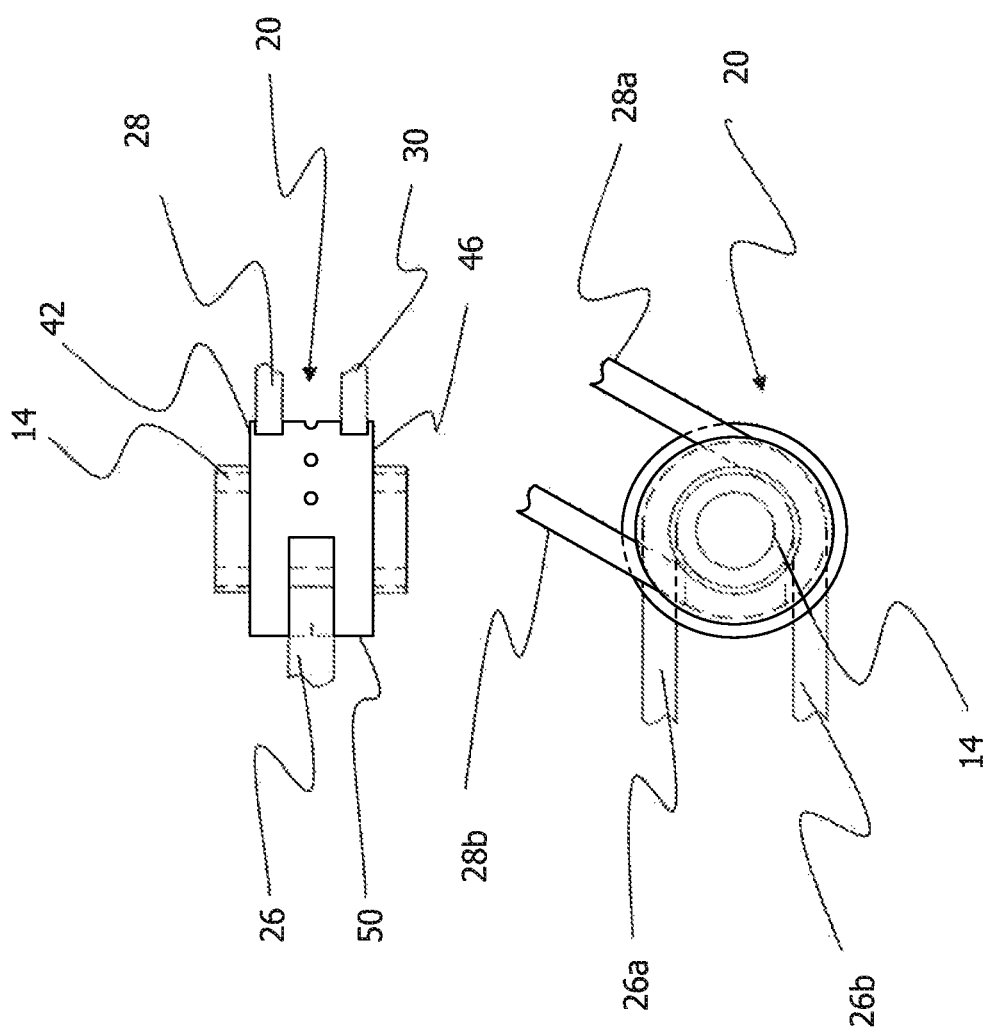

ELASTIC JOINT BODY FOR A SHAFT ARRANGEMENT

This application claims priority to PCT Application No. PCT/EP2009/003270, filed on May 7, 2009, under Section 371 and/or as a continuation under Section 120, which claims priority to German Application No. 102008022475.8, filed on May 7, 2008.

TECHNICAL FIELD

The present invention relates to an elastic joint body for a shaft arrangement for the articulated connection of two shaft sections, comprising a plurality of bushings which are arranged in the circumferential direction in predetermined angular intervals with respect to a centre axis of the joint body, a plurality of loop packets, wherein each loop packet wraps around two adjacent bushings, and a rubber-elastic casing into which the loop packets and the bushings are at least partially embedded.

BACKGROUND

Such joint bodies are known from the prior art and are disclosed e. g. in the unexamined German application DE 27 05 598 A1. This document describes an elastic joint disk, wherein textile loop packets each surround two adjacent bushings, and this arrangement is embedded in a rubber mass. Although such joint disks enjoy a wide-range acceptance and exhibit high reliability with an already long service life, recent efforts are directed to design joint disks in view of the increasing loads due to continuously increasing motor outputs and to prolong the service lives even further.

From the state of the art, further solutions are known for elastic joint bodies for the connection of two shaft sections.

Document DE 42 04 973 A1, for example, indicates a joint disk with a basic skeleton made of synthetic material. The basic skeleton consists of six plastic segments which are integrally injection-moulded together with an outer sleeve. The outer sleeve comprises an inner sleeve which is in connection with the outer sleeve and the plastic segments via rubber buffers. The movability of the inner sleeve is ensured by slots between the rubber buffers. The basic skeleton with the plastic segments and the sleeves accommodated therein is embedded in caoutchouc by injection moulding for manufacturing the joint disk and subsequently vulcanised.

Further, DE 42 43 447 A1 discloses a coupling element for torque transmission with six areas made from elastic material, which are alternately provided with three reinforcing inserts and are arranged in a basic body of the coupling element. The basic body is provided with three triangular recesses, each of which is capable of accommodating a metallic triangular body with a hole and, together with the basic body, forming the coupling element. With holes provided on the triangular bodies, the coupling element may be mutually screw-connected with flanges of shaft sections.

Document DE 10 2006 001 200 A1 discloses a flexible drive train coupling with an insert which comprises a first and a second insert element. Each of the two insert elements comprises a mounting portion to be attached at shaft sections and both are arranged at a central hub section. A second material is poured over the insert elements, which spreads within the spaces between the two insert elements and forms a sheath for the insert elements.

In the above described state of the art, various constructive design possibilities for a joint body for the transmission of torques between the shaft sections are described, each of which being reinforced by inserts or insert elements from a material other than that which is used for the rubber-elastic casing.

In contrast, it is the object of the present invention to provide an elastic joint body of the initially mentioned kind, which meets the increased requirements of the torque transmission and which simultaneously enables a prolonging of the service life.

SUMMARY OF THE INVENTION

This object is solved by an elastic joint body of the initially mentioned kind, in which a support arrangement is embedded at least partially in the rubber-elastic casing, and in which the support arrangement supports at least part of a loop packet between adjoining bushings.

By using a support arrangement with the inventive elastic joint body, the proportion of the force absorption or the load-carrying proportion, respectively, of the loop packets is increased. Moreover, the loop packets are prevented from coming into frictional engagement, which would negatively affect the life of the joint body. The support arrangement prevents such friction effects to a large extent. In addition, the elastic joint body is reinforced by the support arrangement, which enables higher torque absorption. The support arrangement in general provides for an improved guide of the thread packets in the joint body. This arrangement increases the load- carrying proportion of each thread packet so that the joint body in its entirety is able to withstand higher loads over a longer operating period.

In an advancement of the invention, it is provided that pairs of adjacent bushings are surrounded by at least one of the loop packets. The support arrangement forms a guide for the loop packets Furthermore, it is provided in an advancement of the invention that the at least one support arrangement comprises an insert body which is arranged in a spaced relationship between two adjacent bushings as stress relief and support of the parallel strands of the loop packets. By providing an insert body in the inventive joint body, higher torques may be transmitted, with the outer dimensions remaining constant. The insert bodies may be constructively designed in such a manner that they permit a more advantageous surface pressure between the individual components of the support arrangement. Thereby, stress peaks in the joint body may be avoided and the mechanical loads which occur during operation may be distributed more evenly in the joint body.

In order to be able to accommodate and guide the loop packets, a preferred embodiment provides for reception areas in the insert body for parallel strands of at least one loop packet. Due to the joint bodies which are arranged between two adjacent bushings, the loop packets, especially at the outer circumference of the elastic joint body, may be better supported compared to conventional joint bodies, thereby increasing the load-carrying proportion.

Because the loop packets of the elastic joint body which wrap around adjoining bushings are alternately subjected to a tensile or compressive stress because they are alternately located in a tensile section subject to tensile forces and a compression section subject to compression forces for installation reasons, usually two loop packets are arranged at a portion of the elastic joint body which is subjected to a compressive force, while only one loop packet is provided in a tensile section. For this reason, an advancement of the invention provides for such a construction of the joint body that in the joint body successive bushing pairs in the circumferential direction are alternately surrounded by a loop packet pair or a single loop packet, with at least one insert body being provided between two adjoining bushings which are surrounded by a loop packet pair. The insert body comprises reception areas for parallel strands of the loop packet pair. Between two bushings which are surrounded by a single loop packet, at least one insert body is provided which comprises reception areas for parallel strands of the single loop packet.

Because the bushings are arranged in the circumferential direction in predetermined angular intervals with respect to a centre axis of the joint body, an advancement of the invention provides for a plurality of insert bodies to be also arranged in regular angular intervals.

By the alternate arrangement of a loop packet pair and a single loop packet depending on the portions of the elastic joint body which are subject to a compressive force or a tensile force, a further embodiment of the invention provides for the accommodation and support of the loop packets, wherein the at least one insert body comprises reception areas between the bushings for the loop packet pair at corner areas of the insert body. In this context, it should be mentioned with respect to the accommodation of a loop packet which is subject to a tensile force that the insert body comprises reception areas for a single loop packet in a centre portion of the insert body.

In order to achieve a support of the loop packets as stably as possible also in the area of the bushings, another embodiment of the invention provides that the support arrangement comprises at least one support body which is allocated to a single bushing. In this context, the invention may provide that the at least one support body which is allocated to a bushing comprises at least one guideway for at least one loop packet.

As already mentioned above, one bushing is wrapped or surrounded by several, in particular three, loop packets. For separating the individual loop packets from each other in the area of the bushing and for preventing service life-reducing friction effects during operation of the inventive joint body between the loop packets made from the same material, it may be provided according to another embodiment of the invention that the at least one support body which is allocated to one bushing comprises an upper and a lower guideway for a loop packet pair, as well as a centre guideway between the upper and lower guideways that may receive one loop packet surrounded one bushing pair. Preferably, the loop packet which is subjected to a tensile force is accommodated in the centre guideway, while the two loop packets of a loop packet pair in the upper and lower guideways are subjected to a compressive force. Thus, the support bodies with the guideways separate the loop packets which are subjected to different forces from each other.

With respect to the support and to the prevention of friction between adjoining loop packets of the same material, it may be provided according to the invention that the at least one support body at least partially surrounds a plurality of guideways.

According to an embodiment of the invention, the insert body and the support body are preferably made from metal, aluminium, non-ferrous alloys, filled or non-filled synthetics or a thermoplastic elastomer. In one particular embodiment of the invention, it may further be provided that the insert body and the support body are preferably reinforced by embedded carbon, glass and/or metal fibres. The insert bodies and the support bodies may, however, also be made from a metal fabric or from formations which resemble compressed metal wool, i. e. from compressed metal fibres. Apart from the above mentioned advantages, such insert parts offer the additional benefit that they are less rigid and can therefore be deformed more easily. In other words, these insert parts made from metal fabric are flexible upon bending of the inventive elastic joint body.

For the axial support of the loop packets or the support bodies, respectively, and for holding them in their predetermined position on a bushing, another embodiment of the invention provides for a collar which is attached at each end of a bushing, which axially supports the loop packet on the respective bushing.

The invention also relates to a shaft arrangement with an inventive joint body.

BRIEF DESCRIPTION OF THE DRAWINGS

In the following, the invention will be explained by way of example with reference to the accompanying figures; in which:

FIG. 1a is a perspective view of a first embodiment of the invention;

FIG. 2b is a front view of the second embodiment of the invention;

FIGS. 2c and 2d are sectional views of the second embodiment of the invention;

FIG. 3b is a plan view of the third embodiment of the invention;

FIGS. 3c and 3d are sectional views of the third embodiment of the invention;

FIG. 4a is a perspective view of a fourth embodiment of the invention;

FIGS. 4b and 4c show a front view and a sectional view of the fourth embodiment of the invention;

FIG. 6a is a perspective view of a sixth embodiment of the invention;

FIGS. 6b and 6c show a front view and a sectional view of the sixth embodiment of the invention;

FIGS. 7b and 7c show a front view and a sectional view of the seventh embodiment of the invention;

FIGS. 8a and 8b show views of a support body allocated to a bushing;

FIGS. 10a and 10b show views of a support body allocated to a bushing.

DETAILED DESCRIPTION

Figure 1C:
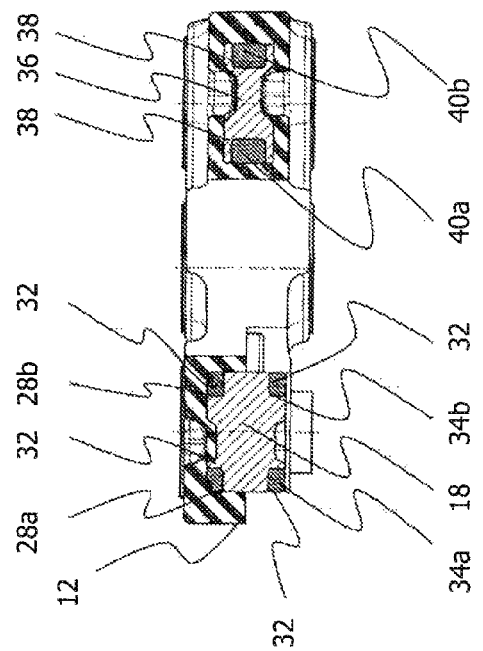
FIGS. 1c and 1d are sectional views of the first embodiment of the invention.

FIG. 1a shows a perspective view of a first embodiment of the inventive elastic joint body 10 with six bushings 14 which are surrounded by a rubber-elastic casing 12.

The bushings 14 are arranged in predetermined angular intervals in the circumferential direction with respect to a centre axis M of the joint body 10. In the cut-away area of the joint body, which is shown in the foreground of the drawing according to FIG. 1a, a support arrangement 16 with an insert body 18 and support bodies 20 and 22 which are allocated to each of the bushings 14 can be seen. Further, collars 24 can be seen in FIG. 1a, which are arranged at the bushings 14 for the axial support of loop packets 26, 28 and 30.

The loop packets 26, 28 and 30 are guided or accommodated, respectively, in guideways which are formed at the support bodies 20, 22 and which will be explained later in detail with reference to FIG. 1d. The support bodies 20 and 22 which are partially closed in the direction of the insert body 18 are of a shape which permits a correspondence with the insert body 18.

FIG. 1a also shows that several loop packets 26, 28 surround a single bushing 14. It may be provided that the loop packet 26, 30 in the installed condition of the joint body 10 in a shaft arrangement is subjected to a tensile force, while the loop packet 28 and a parallel loop packet (not shown in FIG. 1a) embedded in the rubber casing 12 are subjected to a compressive or shearing force, respectively.

Figure 1D:
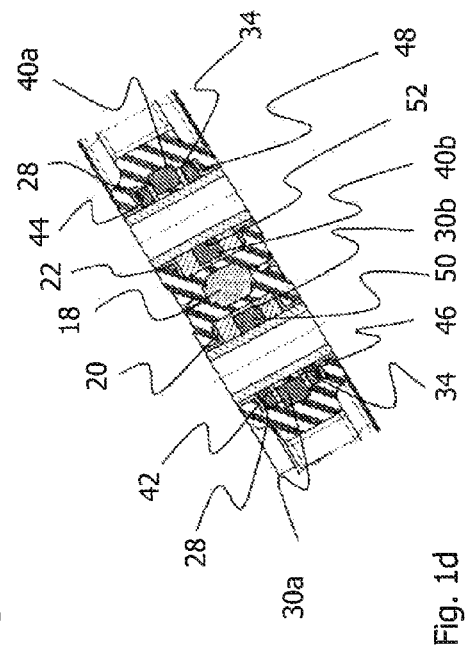
Figure 1B:
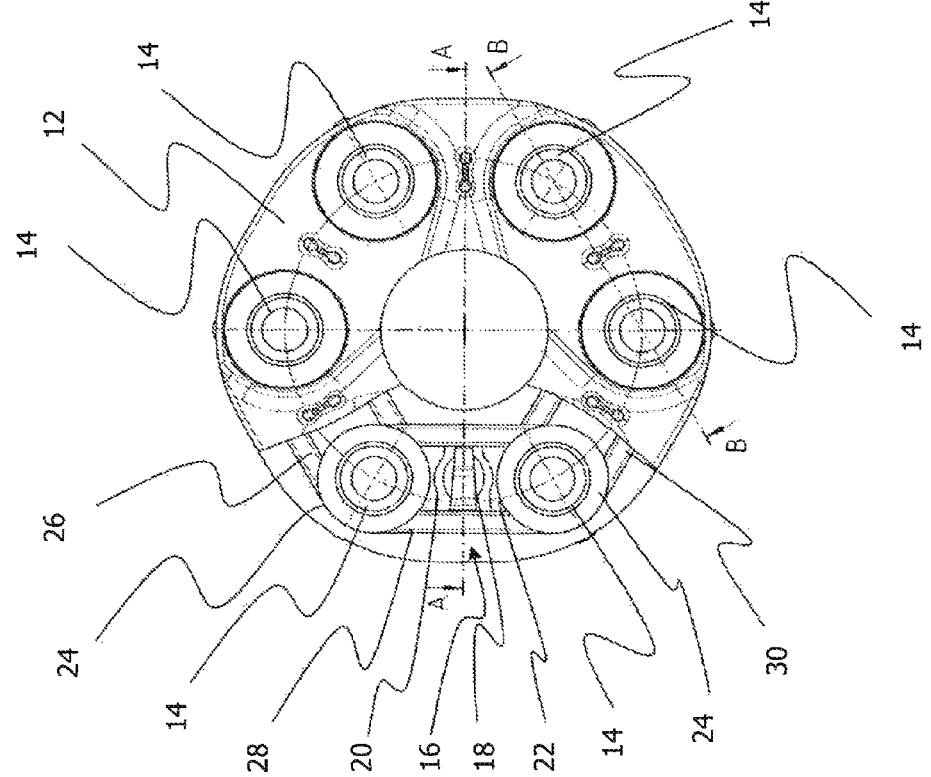
FIG. 1b is a plan view of the first embodiment of the invention.

FIG. 1b is a plan view of the elastic joint body 10 according to FIG. 1a. Therein, the support arrangement 16 with the insert body 18 and the support body 20 or 22, respectively, each of which being allocated to a bushing 14 can be seen. The insert body 18 according to this embodiment of the invention comprises a convex centre part which is formed in correspondence with a concave part of the support bodies 20 and 22. If the loop packet 28 is subjected to a compressive or shearing stress because it is installed in a compression section, the support body 22, the insert body 18 and the support body 20 will approach each other. Due to the concave shape of the insert body 18, however, relative movements of these components are possible. This enables the joint body 10 to be adapted to predetermined bending angle requirements in the case of a cardanic load, and rolling by a cooperation of the support bodies 20, 22 with the insert body 18 about the centre axis of the joint body is facilitated.

FIG. 1c is a sectional view along line A-A in FIG. 1b. The insert body 18 comprises reception areas 32 in corner areas for the parallel strands of the loop packet pair 28, 34, with the parallel strands 28a, 28b of the loop packet 28 being received in upper corner areas and the parallel strands 34a and 34b of the loop packet 34 in lower corner areas. In contrast, the insert body 36 comprises only two reception areas 38 for the parallel strands 40a, 40b of the loop packet 40 in a centre portion. As already mentioned above, the loop packet pair 28, 34 is subjected to compression or shearing forces, respectively, while the loop packet 40 accommodated in the insert body 36 is subjected to a tensile force and therefore has a larger cross-sectional dimension.

FIG. 1d is a sectional view along line B-B in FIG. 1b and shows the insert body 18 with the concave centre portion as well as the support bodies 20 and 22. The support bodies 20 and 22 each comprise an upper guideway 42 and 44 which is formed thereon, which together guide or receive, respectively, the loop packet 28. In the lower guideways 46, 48 of the support bodies 20 and 22, the loop packet 34 of the loop packet pair 28, 34 is likewise guided or received. Between said upper and lower guideways, corresponding centre guideways 50, 52 are formed at the support bodies 20, 22. The individual guideways are separated from each other by material webs of the support bodies 20 and 22, so that the loop packets received therein will not make frictional contact. This may minimize wear due to friction.

In this context, the term guideways refers to the portions of the support bodies 20, 22 in which the individual loop packets are guided around the bushings 14 and at the same time supported. As previously mentioned, the guideways are separated from each other by material webs which therefore also separate the individual loop packets from each other so that frictional effects between stacked loop packets are prevented. The loop packets in the outer circumferential area of the bushing 14 may be supported by the guideways and their associated material webs. This permits a considerable increase of the load-carrying proportion of the individual loop packets in this region. Furthermore, it becomes obvious that the guideways 42, 44, 46, 48 at the support bodies 20, 22 accommodate a loop packet pair 28, 34 which is arranged in a compression section, and that the centre guideways 50, 52 of the support bodies 20, 22 accommodate loop packets 30, 40 which are subjected to a tensile force. Thus, the guideways separate differently stressed loop packets from each other.

The centre guideway 50 of the support body 20 receives the parallel strands 30a, 30b of the loop packet 30, and the guideway 52 of the support body 22 receives the parallel strands 40a, 40b of the loop packet 40. Further, the support body 20 is closed in the direction of the insert body 18 so that it also surrounds the strand 30b of the loop packet 30. The same applies to the support body 22 which encompasses the strand 40a with a closed side. This closed area of the support bodies 20, 22 may be formed in correspondence with the shape of the insert bodies 18, which enables an advantageous cooperation of these two components.

In addition, FIG. 1d illustrates the collars 24 which axially support the loop packets or the support bodies 20, 22, respectively, or which hold them in their predetermined position on the bushing 14, respectively.

In the following, the function of the joint body with an inventive support arrangement 16 will be discussed. The elastic joint body 10 is attached in the known manner at the shaft sections to be connected. As repeatedly mentioned above, the loop packets are subjected to different stresses. In the support arrangement 16 with the insert body 18 and the support bodies 20 and 22 for supporting the loop packet pair 28, 34 which is subjected to a compressive force, the support body 22 will approach the insert body 18 due to a compression of the rubber-elastic casing 12 under operating conditions; the same applies to the insert body 18 which approaches the support body 20. Due to the fact that an elastic joint body 10 is often subjected to a cardanic load in addition to pure torque transmission and therefore exposed to a certain bending angle which occurs because of an offset or a bending angle between the shaft sections to be connected, it is the loop packets at the outer circumference of the joint body 10 which are subjected to higher stresses. According to the invention, the loop packets are, however, also supported by the support arrangement 16 so that their load-carrying proportion is considerably increased.

In the following, further embodiments of the invention will be explained with reference to the remaining figures. In order to avoid repetitions and for the sake of simplicity of the description, components with the same effect or similar components will be identified by the same reference numerals as in the first embodiment, which are, however, preceded by a consecutive numeral.

Figure 2A:
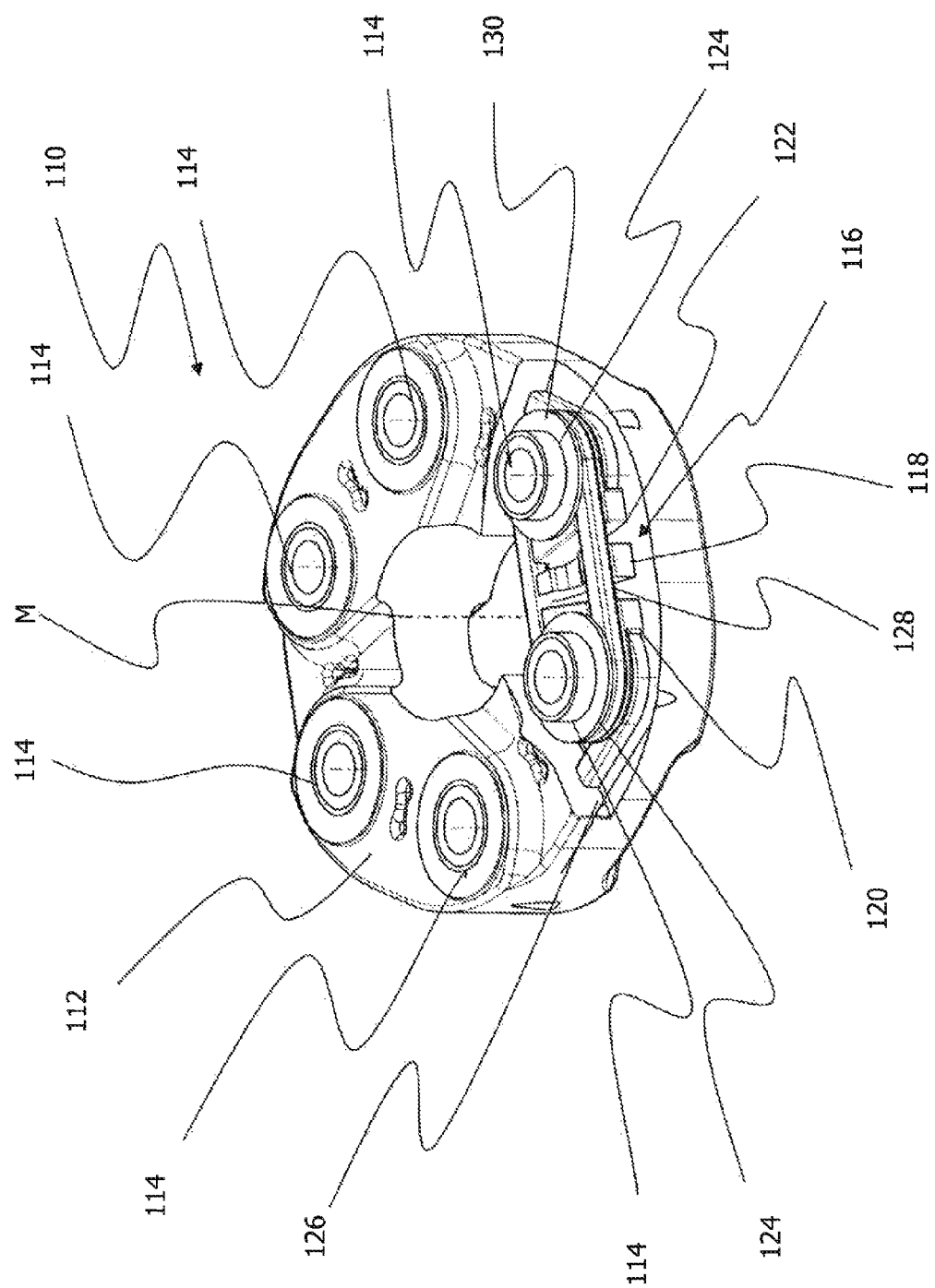
FIG. 2a is a perspective view of a second embodiment of the invention.

FIG. 2a shows the inventive joint body 110 with a support arrangement 116 which comprises an insert body 118 and support bodies 120 and 122 which are allocated to corresponding bushings 114. The embodiment according to FIGS. 2a to 2d differs from the first embodiment according to FIGS. 1a to 1d merely in that the insert body 118 as well as the two support bodies 120, 122 have a shape different from that which was described for the first embodiment.

From FIG. 2b it can be seen that the insert body 118 has a wedge shape tapering towards the centre axis M. The support bodies 120 and 122 therefore comprise a matching chamfered shape which permits a correspondence with the insert bodies 118. The chamfered shape of the support bodies 120, 122 and the wedge shape of the insert body 120 may facilitate rolling of the insert body 118 in the axial direction about the centre of the joint body 110.

FIG. 2c shows a sectional view along line A-A in FIG. 2b. In this case again, reception areas 132 of the insert body 118 for the loop packet pair 128, 134 and the insert body 136 with reception areas for the parallel strands 140a, 140b of the loop packet 140 can be seen.

From FIG. 2d it can be seen that contrary to the embodiment according to FIGS. 1a to 1d, the insert body 118 comprises a rectangular wedge shape without bulges in a centre portion.

Figure 3A:
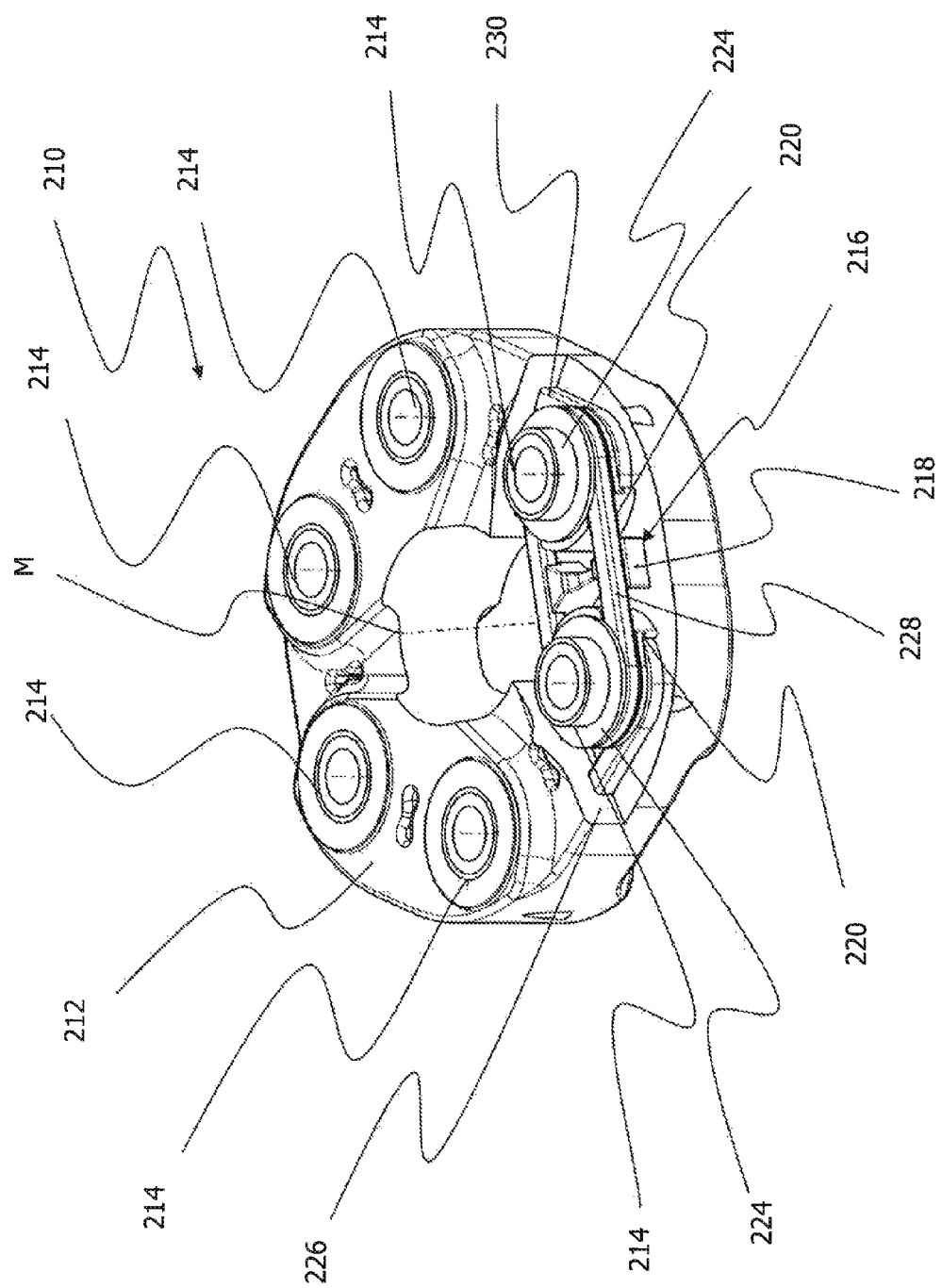
FIG. 3a is a perspective view of a third embodiment of the invention.

FIG. 3a shows a third embodiment of the inventive elastic joint body 210 with the support arrangement 216. Like the previous embodiments, the support arrangement 216 comprises an insert body 218 as well as support bodies 220, 222. The support bodies 220 and 222 are formed in a round shape matching the bushings 214, and the insert body 218 is of a corresponding concave shape so that it corresponds to the geometry of the support bodies 220, 222.

FIGS. 3b to 3d illustrate the elastic joint body 210 with the same components as described in the previous embodiments, however provided with the already described support arrangement 216, whose geometry differs from that of the previous support arrangements.

FIG. 4a shows the inventive elastic joint body 310 with a support arrangement 316 which, in contrast to the previously described embodiments, is formed by only one insert body 318. The insert body 318 is arranged between two adjacent bushings 314 and encompasses the loop packet 328 or is penetrated by same, respectively.

FIG. 4b again is a plan view of the elastic joint body 310 with the insert body 318 which comprises concave bulges so that it corresponds to the geometry of the bushings 314 or to that of the loop packets, respectively, which wrap around the bushings 314.

The sectional view according to FIG. 4c clearly shows that the insert body 318 is penetrated by the parallel strands 328a, 328b of the loop packet 328 or by the parallel strands 334a, 334b, respectively, of the loop packet 334. The insert body 336 which accommodates a loop packet 340 with parallel strands 340a, 340b subjected to a tensile stress, comprises, as already mentioned in the previous embodiment, reception areas 338 in a centre portion for the mentioned parallel strands of the loop packet 340.

Figure 5A:
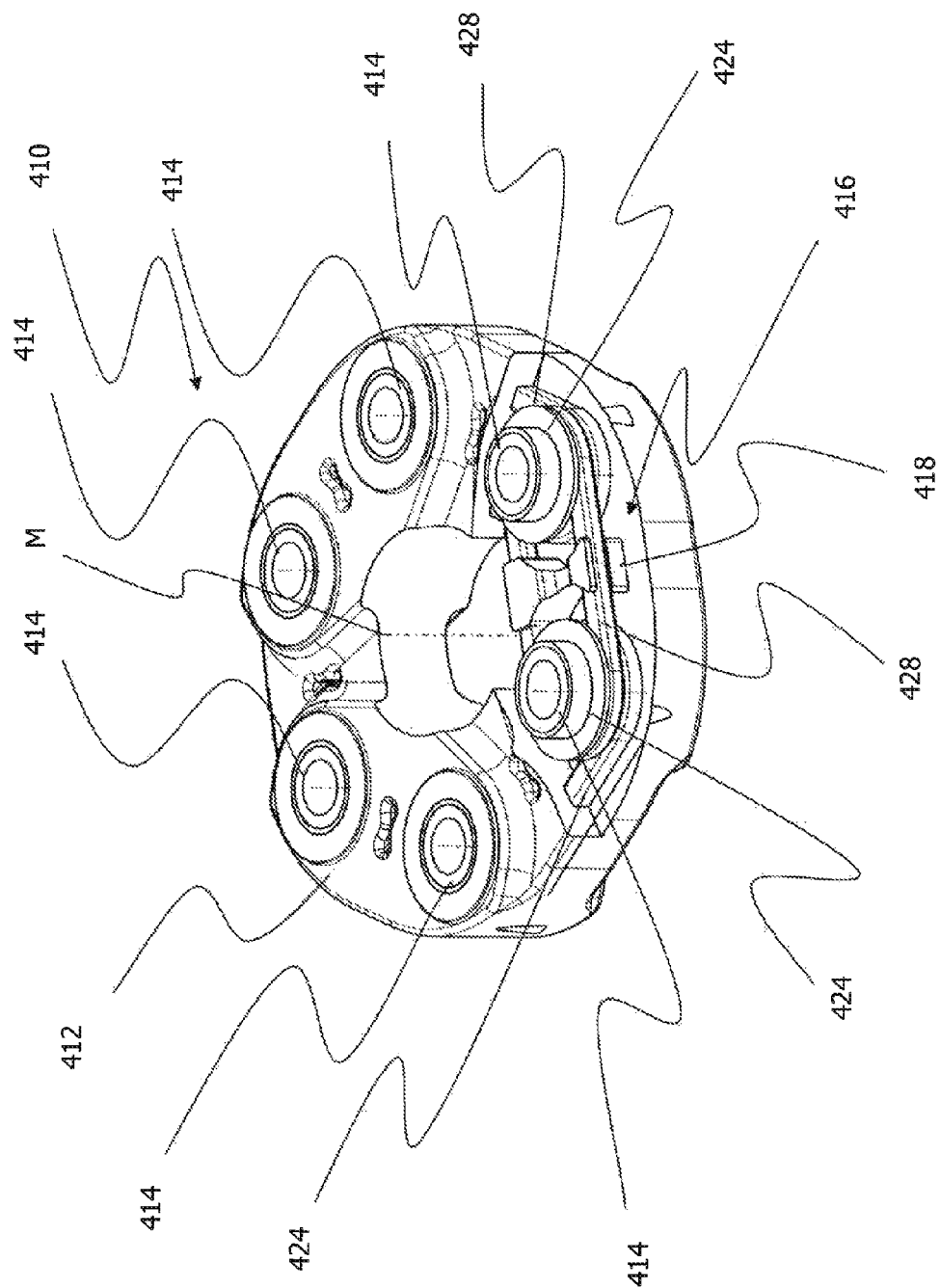
FIG. 5a is a perspective view of a fifth embodiment of the invention.
Figures 5B, 5C:
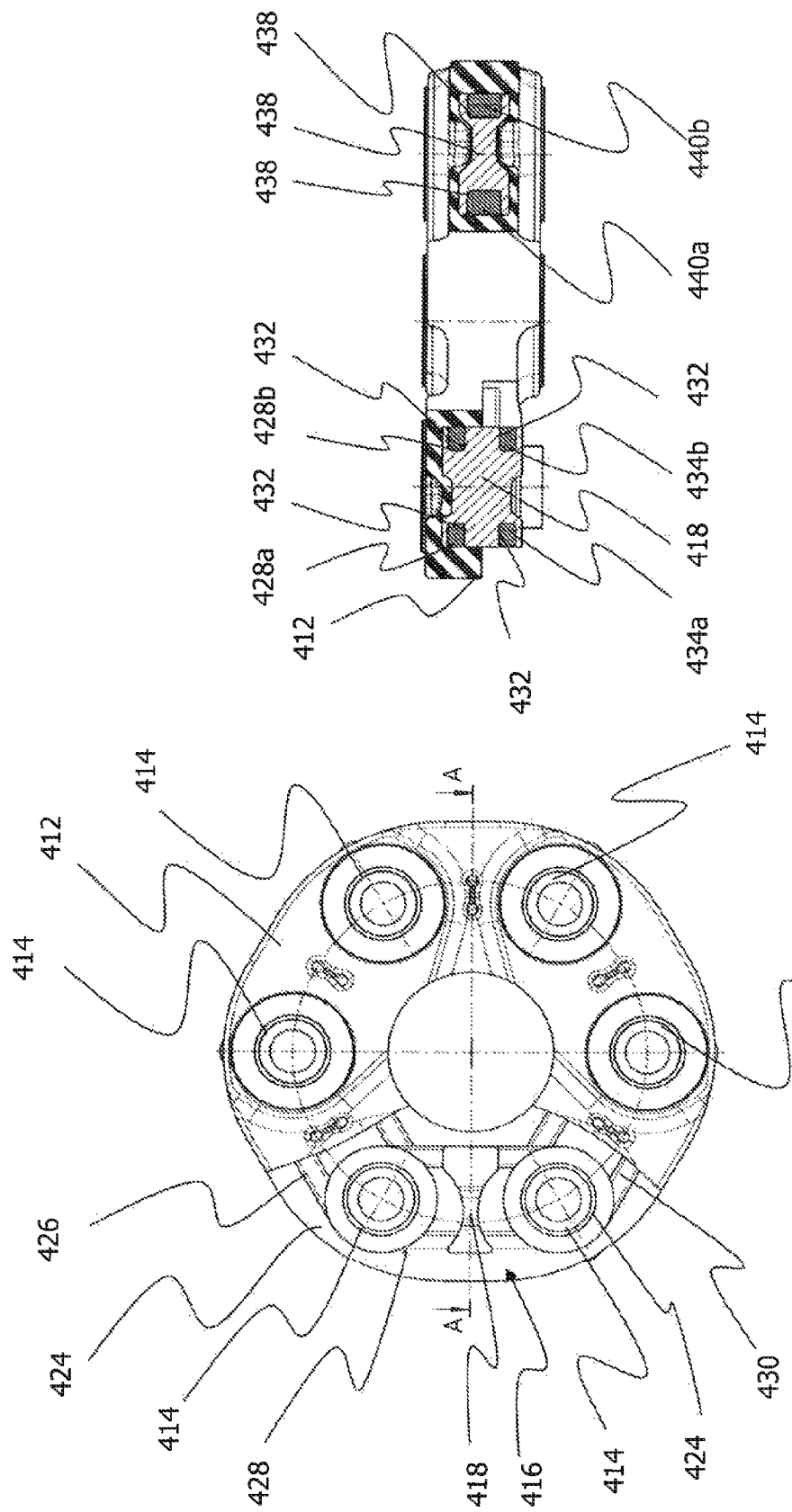
FIGS. 5b and 5c show a front view and a sectional view of the fifth embodiment of the invention.

FIGS. 5a to 5c show another embodiment of the present invention, wherein the insert body 418 is provided with groove-like reception areas 432 for the parallel strands 428a, 428b of the loop packet pair 428. The insert body 438 installed in the tensile section again comprises reception areas 438 for the parallel strands 440a, 440b of the loop packet 440 in a centre portion.

From FIGS. 6a to 6c which illustrate still another embodiment of the invention, it can be seen that the insert body 518 according to this embodiment of the invention is formed with a constriction in the centre and thus slightly narrower, and then slightly broadens towards the end. The corner areas of the insert body 518 comprise reception areas 538 for the parallel strands of the loop packet pair 528, 532.

Figure 7A:
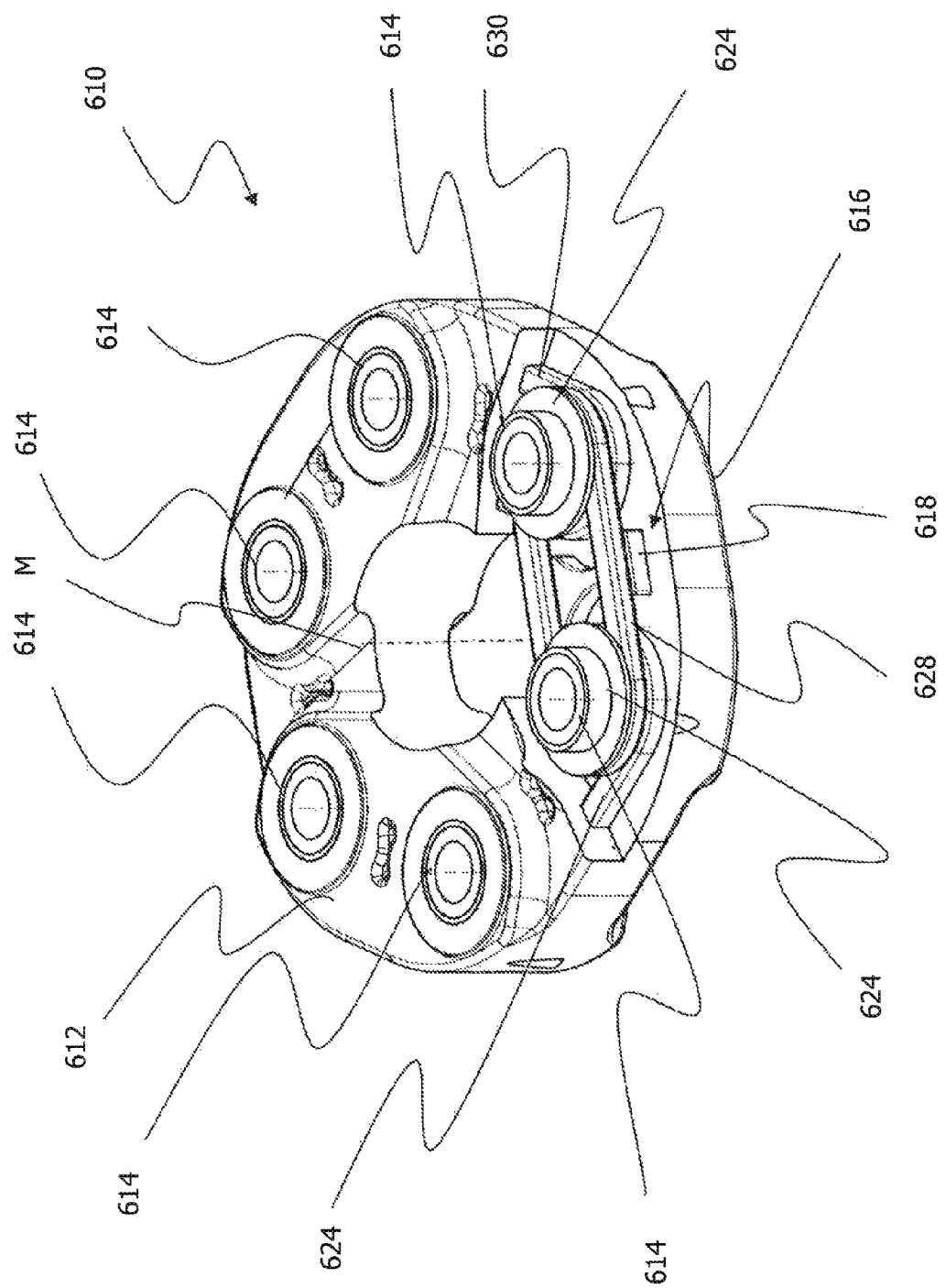
FIG. 7a is a perspective view of a seventh embodiment of the invention.

The embodiment according to FIGS. 7a to 7c shows an insert body 618 with essentially orthogonally extending surfaces relative to the centre axis M, with which the parallel strands of the loop packet pair 628, 634 may come into contact, i.e. the insert body 618 is designed in such a manner that it may be inserted between the parallel strands of the loop packet pair 628 and 634. The insert body 618 supports the loop packets, in particular, in the case of a cardanic load, and additionally reinforces the elastic joint body.

In the following, further constructive design possibilities for a support body will be explained. First, it is to be mentioned that the individual support bodies and the guideways or their portions, respectively, between the various loop packets may be formed larger or stronger, respectively, depending on the torques to be transmitted and the resulting dimensioning of the elastic joint body. This also applies to the already described embodiments.

FIGS. 8a and 8b show a support body 20 with an upper guideway 42 for the loop packet 28, a lower guideway 46 for guiding the loop packet 30 as well as a centre guideway 50 for loop packet 26. The support body according to FIGS. 8a and 8b is formed so as to be open, i.e., the support body does not completely enclose the loop packets.

Figures 9A, 9B:
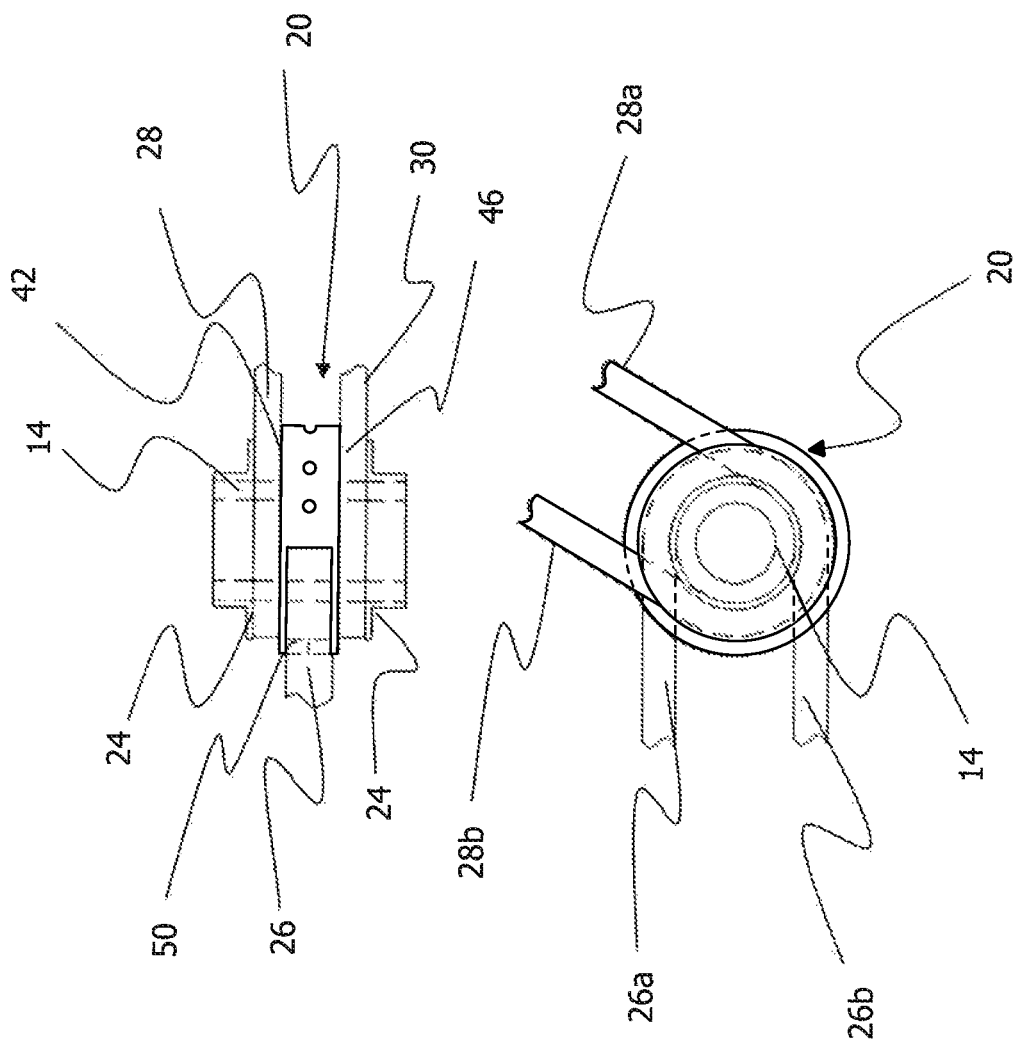
FIGS. 9a and 9b show views of a support body allocated to a bushing.

FIGS. 9a and 9b show a support body 20 which partially encloses the centre guideway 50 between the loop packet pair 28, 30 subjected to a compressive force. At the site where the loop packet subjected to a compressive force exits the bushing 14 arranged in the support body 20, this loop packet is no longer enclosed. The two loop packets 28 and 34 subjected to a compressive force are not enclosed at all.

On the other hand, FIGS. 10a and 10b show a support body 20 which partially encompasses the guideways 42, 46 and 52 as well as all loop packets 28, 30, 32 at the outer circumference which wraps around the bushings.

With respect to the manufacture of the support arrangement with insert bodies and support bodies, the insert bodies are either placed into a mould and then injection-moulded with a rubber-elastic material, or a skeleton of synthetic material is pre-injected and then coated with a rubber-elastic material.

The variety of the embodiments of the invention in general indicates possibilities for the support of the individual loop packets relative to each other, for the prevention of a mutual contact of the loop packets in such areas where relative movements may occur, in particular, in areas close to the bushings, in order to eliminate frictional effects, and for the improvement of the torque-transmitting properties of correspondingly configured joint bodies.

The invention claimed is:

1. An elastic joint body for a shaft arrangement for the articulated connection of two shaft sections, comprising:
   a plurality of bushings which are arranged in the circumferential direction in predetermined angular intervals with respect to a centre axis of the joint body,
   a plurality of loop packets, with each loop packet wrapping around two adjacent bushings each, and
   a rubber-elastic casing, in which the loop packets and the bushings are at least partially embedded,
   wherein one support arrangement composed of a different material than the rubber-elastic casing is at least partially embedded in the rubber-elastic casing, the support arrangement comprising an insert body which is located in a spaced relationship between adjacent bushings and at least one support body, each of which is located between the insert body and one of the adjacent bushings,
   wherein each of the insert body and the support body is supporting at least part of a loop packet between adjacent bushings to prevent frictional contact between multiple loop packets and to reinforce the loop packets by increasing resistance to loads and torques applied to the loop packets, thereby increasing the load carrying proportion of the loop packets, and wherein the insert body and the support body include external facing surfaces defining corresponding opposite shapes, which allow a correspondence between the support body and the insert body.

2. The joint body according to claim 1, wherein adjacent bushings are surrounded by at least one of the loop packets, with the support arrangement forming a guide for the loop packets.

3. The joint body according to claim 1, wherein the insert body comprises reception areas for parallel strands of at least one loop packet.

4. The joint body according to claim 1, wherein in the joint body successive bushing pairs in the circumferential direction are alternatively surrounded by a loop packet pair or an individual loop packet, wherein at least one first insert body is provided between two adjacent bushings which are surrounded by a loop packet pair, with the first insert body including reception areas for parallel strands of the loop packet pair, and wherein between two bushings which are surrounded by a single loop packet at least one second insert body is provided, the second insert body including reception areas for parallel strands of the single loop packet.

5. The joint body according to claim 4, wherein the first insert body between the bushings comprises reception areas for a loop packet pair at corner areas.

6. The joint body according to claim 4, wherein the second insert body comprises reception areas in a central portion for a single loop packet.

7. The joint body according to claim 1, wherein a plurality of insert bodies are arranged in regular angular intervals with respect to a centre axis of the joint body.

8. The joint body according to claim 1, wherein the at least one support body comprises at least one guideway for at least one loop packet.

9. The joint body according to claim 8, wherein the at least one support body comprises an upper guideway and a lower guideway for a loop packet pair, and a centre guideway between the upper and lower guideways.

10. The joint body according to claim 9, wherein the centre guideway of the at least one support body accommodates a single loop packet which surrounds a bushing pair.

11. The joint body according to claim 10, wherein the at least one support body at least partially encloses a plurality of guideways.

12. The joint body according to claim 1, wherein at least one of the insert body and the support body is made from metal, metal fabric, metal wool, aluminum, non-ferrous alloys, filled or non-filled synthetics, or a thermoplastic elastomer.

13. The joint body according to claim 12, wherein the insert body and the support body are reinforced by embedded carbon, glass or metal fibres.

14. The joint body according to claim 1, wherein at each end of a bushing a collar is attached which axially supports the loop packet on the respective bushing.

15. A shaft arrangement with a joint body according to claim 1.

16. The joint body according to claim 1, wherein the correspondence allowed between the support body and the insert body includes enabling relative movement of the support body and the insert body when the external facing surfaces approach one another into abutting contact, and wherein the external facing surfaces define identical and opposite (mirror-image) shapes.

17. The joint body according to claim 1, wherein the corresponding opposite shapes of the support body and the insert body include a concave shape and a convex shape.

18. The joint body according to claim 1, wherein the corresponding opposite shapes of the support body and the insert body include a wedge shape and a chamfered shape.

* * * * *

UNITED STATES PATENT AND TRADEMARK OFFICE
CERTIFICATE OF CORRECTION

| | | |
|---|---|---|
| PATENT NO. | : 8,512,154 B2 | Page 1 of 1 |
| APPLICATION NO. | : 12/991618 | |
| DATED | : August 20, 2013 | |
| INVENTOR(S) | : Achim Rothe et al. | |

It is certified that error appears in the above-identified patent and that said Letters Patent is hereby corrected as shown below:

On the Title Page, Item (73), line 3: Assignee's city "Walkrajburg" should read -- Waldkraiburg --.

Signed and Sealed this
Twenty-second Day of October, 2013

Teresa Stanek Rea
*Deputy Director of the United States Patent and Trademark Office*